Jan. 8, 1935. V. J. BURNELLI 1,987,049
RETRACTIBLE LANDING GEAR FOR AIRPLANES
Filed Feb. 23, 1933 2 Sheets-Sheet 2
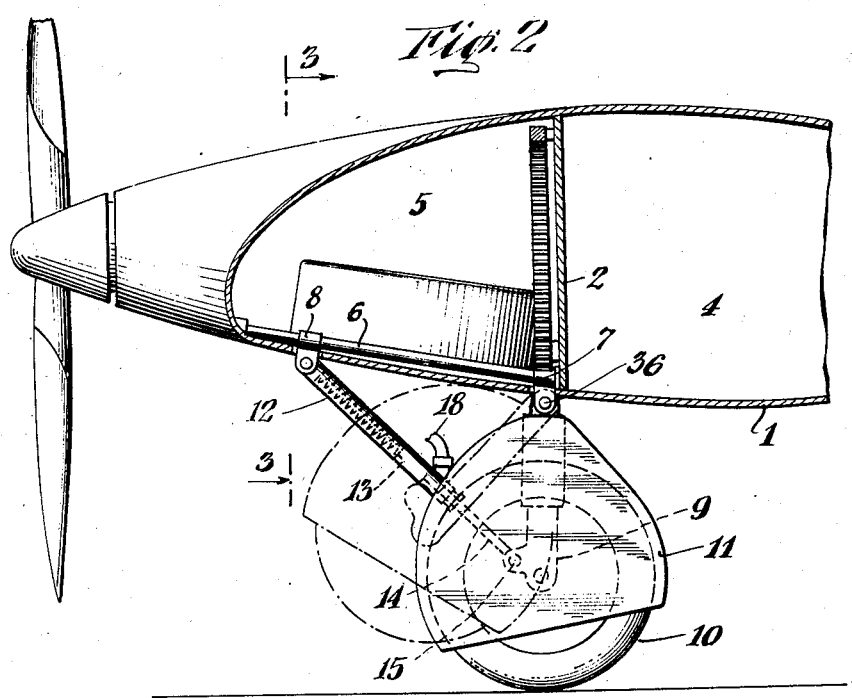
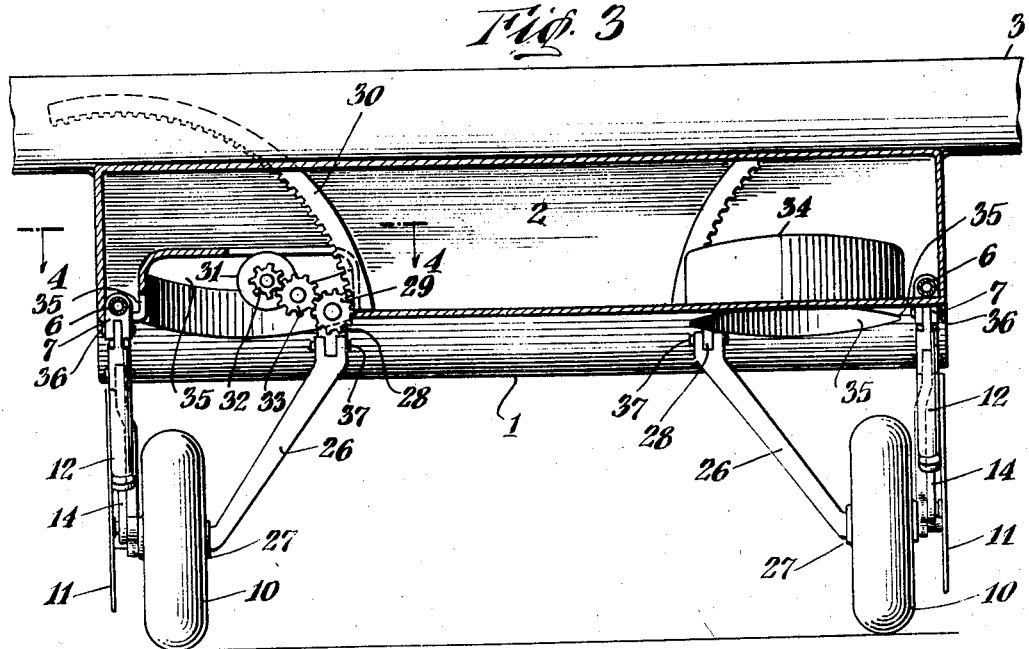
INVENTOR
Vincent J. Burnelli
BY
Frederic W. Barker
ATTORNEY Patented Jan. 8, 1935

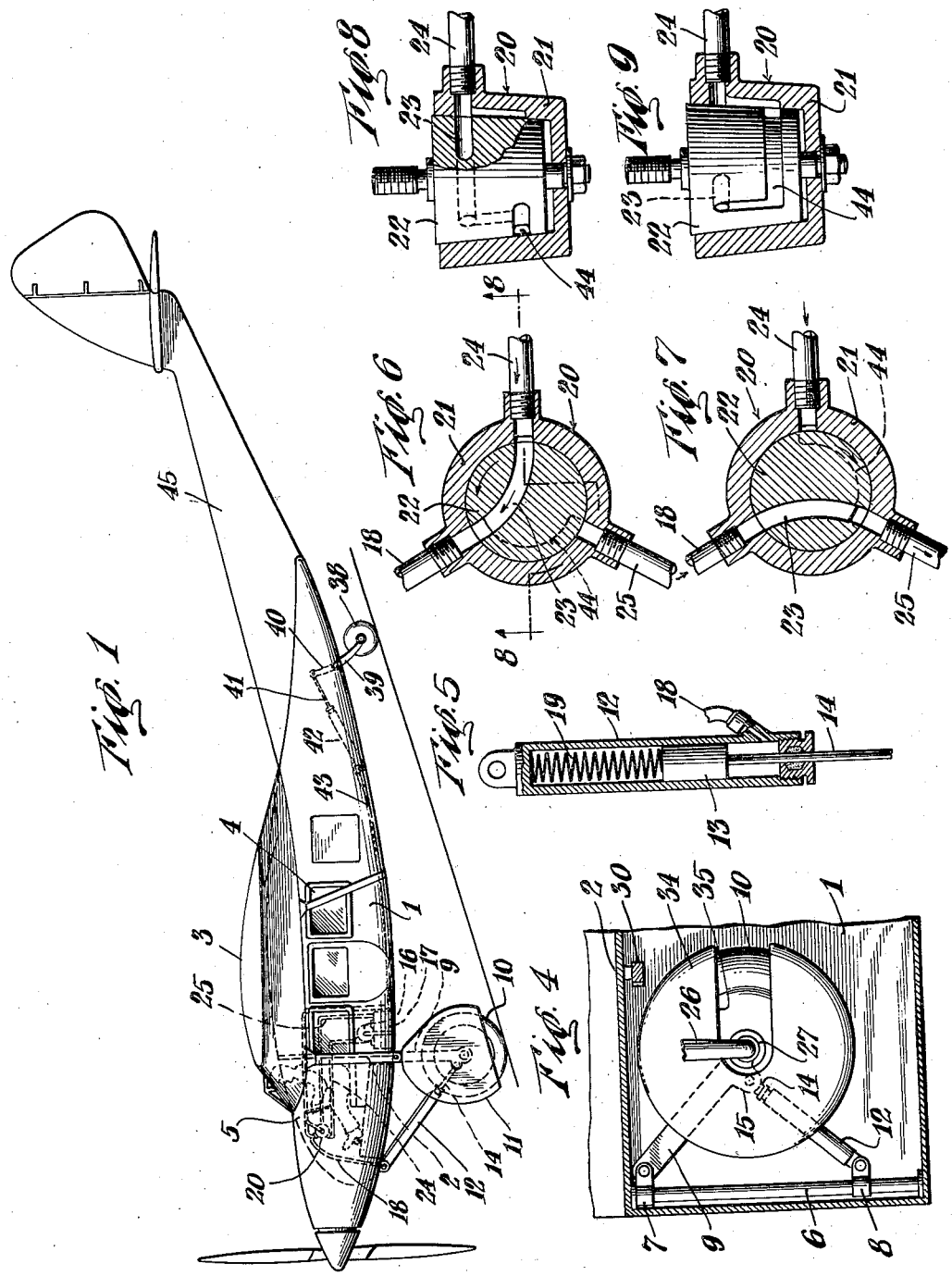

1,987,049

UNITED STATES PATENT OFFICE 1,987,049

RETRACTIBLE LANDING GEAR FOR AIRPLANES

Vincent J. Burnelli, New York, N. Y., assignor to Burnelli Aircraft, Ltd., Dover, Del., a corporation of Delaware Application February 23, 1933, Serial No. 658,116

4 Claims. (Cl. 244—2)

This invention relates to retractible landing gear for airplanes, and my improvement is directed particularly to means for swinging the wheel supports forwardly in the retracting operation, so that then the supports and wheels can be swung inwardly and upwardly, to become lodged in pockets provided therefor in the body base, ahead of the forward spar or bulkhead.

It is to be understood that the body, to be capable of providing lodgment for the folding landing gear must have sufficient width for the purpose, such for example as is found in a transport airplane of the Burnelli type, wherein the fuselage or body is in the form of a wing section.

Certain structural considerations enter into the new arrangement for holding the landing gear up against the forward portion of the fuselage, or body, in advance of the forward spar, so that the fuselage or body portion, rearward of such forward spar, which constitutes the passenger compartment or cabin, may be left free and clear, without being cumbered with the inverted wells or recesses that are required in which to lodge the retracted wheels, such inverted wells or recesses, if formed in the base of the passenger compartment, interfering with and restricting the clear floor space of the cabin.

The body portion in advance of the forward spar is occupied by the pilot, whose seated position is usually elevated above the floor, and hence the projection into this portion of the inverted wells or recesses is relatively unimportant.

The tail skid, which may be in the form of a wheel, is also retractible, and the operating means for retracting and projecting the landing gear may function equally and synchronously with respect to the tail skid.

Other features and advantages of my invention will hereinafter appear.

In the drawings:

Figure 1 is a side elevation of an airplane provided with my improved retractile landing gear.

Fig. 2 is an enlarged partial side sectional elevation of the same.

Fig. 3 is a cross section, taken on the line 3—3 of Fig. 2.

Fig. 4 is a sectional detail, taken on the line 4—4 of Fig. 3.

Fig. 5 is an enlarged sectional detail of the fluid pressure operating means.

Figs. 6 and 7 are respective cross-sectional views of a valve such as may be used for supplying fluid pressure to the operating means, and Figs. 8 and 9 are respectively side sections of Figs. 6 and 7.

In said figures let 1 indicate a relatively wide fuselage or airplane body, which may be in the form of a wing section, and which is provided with a front spar or bulkhead 2, main supporting airfoils 3 being extended, spanwise, respectively, from opposite sides of said fuselage, at the upper portion thereof, to thus constitute what is known as a high-wing monoplane.

The rearward portion of the fuselage or body with respect to the front spar 2 includes the cabin or passenger compartment, here indicated at 4, and the fuselage or body portion in advance of the front spar or bulkhead 2, is the nose of said body and includes a pilot's cockpit, here being indicated at 5.

Secured to the body portion 5, respectively at each side thereof, are shafts 6, said shafts extending longitudinally, and straps 7 and 8 are mounted on said shafts. Each strap 7 pivotally carries a hanger 9 which is adapted to swing forwardly from its normal, vertical position, and return thereto.

The hangers 9 each have, near their lower ends, a journal bearing for a traction wheel such as is here indicated at 10, said hanger also carrying a cover member 11, which will be more particularly referred to hereinafter.

The strap 8, which is spaced from strap 7 along shaft 6, has pivotally connected therewith at one end a cylinder 12, in which is operatively fitted a plunger 13, said plunger having a rod 14 that is passed through the opposite, plugged end of cylinder 12, and is pivotally connected with an offset or lug 15 on hanger 9.

The cylinder 12 with its plunger 13 and rod 14 may be termed an oleo strut that normally extends at a relatively acute angle to hanger 9, forwardly thereof, but is capable of contracting, as the hanger is swung forwardly, to the dotted line position of hanger 9 and wheel 10 appearing in Fig. 2.

A pump, indicated at 16, may serve to supply pressure, as from a fluid containing tank 17, to the cylinder 12, by means of a pipe connection 18, to move the plunger 18 against a return action spring 19. The two-way valve 20, under the pilot's control, may direct the fluid pressure to cylinder 12 when the wheels are to be retracted, or cause the fluid to be returned to the tank when the wheels are to be extended.

The valve which appears in Figs. 6 to 9 has the casing 21 and stem 22, and the stem is provided with the gland 23 which when shifted to the position shown in Figs. 6 and 8 connects the supply pipe 24 with the pipe 18; and when in the position of Figs. 7 and 9, connects the supply pipe 24 back to the tank by way of return pipe 25, at the same time allowing the passage of the supply fluid through channel 44 to the tank.

Obviously the power means herein described and illustrated for operating the contractible and expansible strut are given by way of example only, since other suitable power means may be employed to accomplish the same purpose.

The movement forwardly of the wheels 10 as through the medium of the contractible and expansible strut, accomplishes the first part of the operation involved in retracting said wheels, it being necessary, when the wheels have been swung forwardly, in the manner indicated, to then complete the operation of swinging said wheels into a horizontal position up against the under surface of the forward body portion 5.

It should be noted that the wheels are each provided with a bracket or inclined arm 26 that is rigidly connected at one end to the inner hub 27, and whose other ends are pivotally connected respectively to mounts 28 that are normally disposed near the bottom of the body portion, adjacent the bulkhead 2. The mounts 28 each pivotally carry a gear 29 that is in mesh with an arcuate rack 30, said racks respectively being disposed at opposite sides of the body and secured to bulkhead 2 at the forward side thereof. Also carried by the mounts 28 are motors 31, whose rotors each carry a gear 32 that drives the gear 29 through the medium of an intermediary gear 33, to thereby move the mounts 28 together with arms 26 and wheels 10 up toward the bottom of the body. Obviously I am not to be limited to the particular retractible mechanism herein described and illustrated, since the retraction may be effected by other suitable means.

In order that the wheels may become completely lodged in the under surface of the body portion 5, that they may not offer their bulk to head resistance in flight, I provide inverted wells or recesses 34, formed upwardly in the base of body portion 5, to be thus forward of bulkhead 2, said wells being adapted respectively to receive the wheels 10, and by means of slots 35 to also receive the hangers 9 and cylinders 12, when the wheels have been fully retracted. As thus retracted the cover plates 11 are intended to fit within the wells 34 and to lie flush with the under surface of the body portion.

The transverse pivots 36, 37 upon which the hangers 9 and the arms 26 are mounted permit the initial forward movement of the wheels, to carry them from their normal position beneath bulkhead 2 to positions in advance of said bulkhead, whence said wheels can be swung inwardly and upwardly, through the operation of the motors, for lodgement in the wells.

A skid wheel 38 is shown as carried by a fork 39 that is pivotally supported in the body, as shown, and has a continuing arm 40 that engages a plunger rod 41 which operates a plunger in a cylinder 42 in the same manner as the oleo struts operate for the main wheels. The cylinder 42 is connected with the valve 20 by tube 43 for the retraction and extension of the skid wheel, which is adapted to pass through a slot (not shown) in the base of the body, simultaneously with the corresponding operations of the main wheels.

As will be seen in Fig. 1, the empennage support there illustrated consists of vertical fins or outriggers 45, one only appearing in the side elevation of said figure, said fins or outriggers extending rearwardly and upwardly from the rear portion of the body 1, and as said body is a wing section, consequently said fins or outriggers are extended from its trailing edge. The rearwardly upward inclination of the fins or outriggers, which gives them a tapering or triangular form, is intended to position the empennage, in normal flight, above the plane of the wash from the wing, and also to provide ample downward clearance so that in landing at a stalling angle the tail skid, which depends from the body wing, near its trailing edge, will make surface contact in such landing and prevent the empennage from hitting the surface.

Variations within the spirit and scope of my invention are equally comprehended by the foregoing disclosure.

I claim:—

1. In an airlane, retractible landing gear pivoted thereto and adapted, in retraction, to be swung first forwardly and then inwardly upward, and separate means for controlling the respective forward and inwardly upward movements.

2. In an airplane, a body, traction wheels and respective supporting means for said wheels, said supporting means comprising hangers and forwardly inclined contractible and expansible struts that are mounted on said body in manner to swing both forwardly and inwardly upward, and respective power means for separately moving said wheels with their supporting means first forwardly and then inwardly upward.

3. In an airplane, retractible landing gear pivotally connected thereto, means for moving said landing gear forwardly, means for moving said landing gear upwardly, and common control means for both said moving means.

4. In an airplane, retractible landing gear pivotally connected thereto, means for moving said landing gear forwardly, means for moving said landing gear inwardly upward, and common control means for both said moving means.

VINCENT J. BURNELLI.